US010323997B2

(12) United States Patent
Chuck et al.

(10) Patent No.: US 10,323,997 B2
(45) Date of Patent: Jun. 18, 2019

(54) SYSTEMS AND METHODS FOR CORRECTING ACOUSTIC ERROR IN PRESSURE SENSORS (71) Applicant: The Boeing Company, Chicago, IL (US)

(72) Inventors: Chen Chuck, Mercer Island, WA (US); Sho Sato, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 155 days.

(21) Appl. No.: 15/641,148

(22) Filed: Jul. 3, 2017

(65) Prior Publication Data
US 2019/0003912 A1 Jan. 3, 2019

(51) Int. Cl.
*G01L 19/00* (2006.01)
*G01L 27/00* (2006.01)
*G01M 9/06* (2006.01)
*B64D 43/00* (2006.01)
*G01P 13/02* (2006.01)
*G01M 9/08* (2006.01)

(52) U.S. Cl.
CPC .......... *G01L 19/0092* (2013.01); *B64D 43/00* (2013.01); *G01L 27/002* (2013.01); *G01M 9/06* (2013.01); *G01P 13/025* (2013.01); *G01M 9/08* (2013.01)

(58) Field of Classification Search
CPC ..... G01L 19/00; G01L 19/0092; G01L 19/02; G01L 19/04; G01L 27/00; G01L 27/002; G01M 9/06; G01M 9/08; G01P 13/025; B64D 43/00
See application file for complete search history.

(56) References Cited

U.S. PATENT DOCUMENTS

| 2,512,790 A | * | 6/1950 | Cleveland | ................. B64C 9/32 244/1 N |
| 3,132,244 A | * | 5/1964 | Kemmer | ................. G06G 7/70 702/138 |

(Continued)

FOREIGN PATENT DOCUMENTS

| EP | 2453245 | 5/2012 |
| EP | 2919018 | 9/2015 |

*Primary Examiner* — Nguyen Q. Ha
(74) *Attorney, Agent, or Firm* — Haynes and Boone, LLP (57) ABSTRACT Various techniques are provided for correcting error in static pressure data. In one example, a system includes an aircraft component. The aircraft component can include a port disposed within the aircraft component. A static pressure sensor is disposed within the port. The static pressure sensor is configured to provide primary pressure data in response to environmental air pressure. The data provided can include error due to acoustic disturbance. The system can also include an acoustic sensor configured to provide acoustic data in response to the acoustic disturbance. Data from the static pressure sensor and the acoustic sensor can be provided to a processor communicatively coupled to the static pressure sensor and the acoustic sensor. The processor can be configured to determine corrected static pressure data using the provided primary pressure data and the provided acoustic data. Additional systems and similar methods are also provided.

20 Claims, 6 Drawing Sheets (56) References Cited

U.S. PATENT DOCUMENTS

| | | | | |
|---|---|---|---|---|
| 3,585,859 | A | * | 6/1971 | De Leo ................. B64D 43/02 73/700 |
| 6,038,932 | A | | 3/2000 | Wandel et al. |
| 9,574,963 | B2 | * | 2/2017 | Robert ..................... G01P 5/16 |
| 2010/0100260 | A1 | | 4/2010 | McIntyre et al. |
| 2017/0158336 | A1 | | 6/2017 | Meis et al. |

* cited by examiner

SYSTEMS AND METHODS FOR CORRECTING ACOUSTIC ERROR IN PRESSURE SENSORS

TECHNICAL FIELD

The disclosure relates generally to aircraft pressure detection and more specifically to accurate detection of environmental static pressure associated with the aircraft.

BACKGROUND

Aircraft are configured to detect static pressure of an environment around the aircraft and/or within the aircraft. Operation of aircraft is aided through such static pressure measurements. Static pressure can be measured through static pressure sensors disposed within a static pressure port. The static pressure port can be configured to increase accuracy of the static pressure measurements.

The static pressure measurements aid in determination of one or more of operational characteristics of the aircraft and/or in operation of the aircraft. Such operational characteristics can be used to help control and/or operate the aircraft. Accordingly, accurate measurement of static pressure is important. Inaccuracies, due to error, in measured static pressure may cause inaccuracies in determinations of such characteristics and/or may lead to less than optimal operation of the aircraft. Such error can include error from airflow bleeding into the port and/or acoustic disturbance within an environment around the static pressure sensor. Such airflow and/or acoustic disturbance can lead to error in measuring the static pressure determined by the static pressure sensor.

SUMMARY

Systems and methods are disclosed for correcting error from acoustic disturbance in static pressure sensor readings. In one example, a system can be disclosed. The system can include an aircraft component, a port disposed within the aircraft component, a static pressure sensor disposed within the port and configured to provide primary pressure data in response to at least environmental air pressure and an acoustic disturbance, an acoustic sensor configured to provide acoustic data in response to the acoustic disturbance, and a processor communicatively coupled to the static pressure sensor and the acoustic sensor and configured to determine corrected static pressure data using the provided primary pressure data and the provided acoustic data.

In another example, a method can be disclosed. The method can include receiving primary pressure data from a static pressure sensor in response to at least environmental air pressure and an acoustic disturbance, where static pressure sensor is disposed within a port, and where the port is disposed within an aircraft component, receiving acoustic data from an acoustic sensor in response to the acoustic disturbance, and determining corrected static pressure data using the received primary pressure data and the received acoustic data.

The scope of the invention is defined by the claims, which are incorporated into this section by reference. A more complete understanding of the disclosure will be afforded to those skilled in the art, as well as a realization of additional advantages thereof, by a consideration of the following detailed description of one or more implementations. Reference will be made to the appended sheets of drawings that will first be described briefly.

BRIEF DESCRIPTION OF THE DRAWINGS

Examples of the disclosure and their advantages are best understood by referring to the detailed description that follows. It should be appreciated that like reference numerals are used to identify like elements illustrated in one or more of the figures.

DETAILED DESCRIPTION

Various systems and methods for correcting acoustic noise errors associated with pressure readings are disclosed herein. In certain examples, air pressure of an environment and acoustic disturbance of the environment is measured. Static pressure of the environment is then determined from the air measured pressure and the acoustic disturbance.

In certain examples, such static pressure can be determined from data from one or more static pressure sensors disposed within one or more static pressure ports. The static pressure sensors can be configured to measure a pressure within the static port (e.g., the static pressure). The acoustic disturbance can be determined from one or more acoustic sensors disposed next to the one or more static pressure ports. Characteristics of the acoustic disturbance (e.g., frequency and amplitude of the acoustic disturbance) can be determined by the one or more acoustic sensors and such determined characteristics can be used to correct the measured pressure readings.

Figure 1:
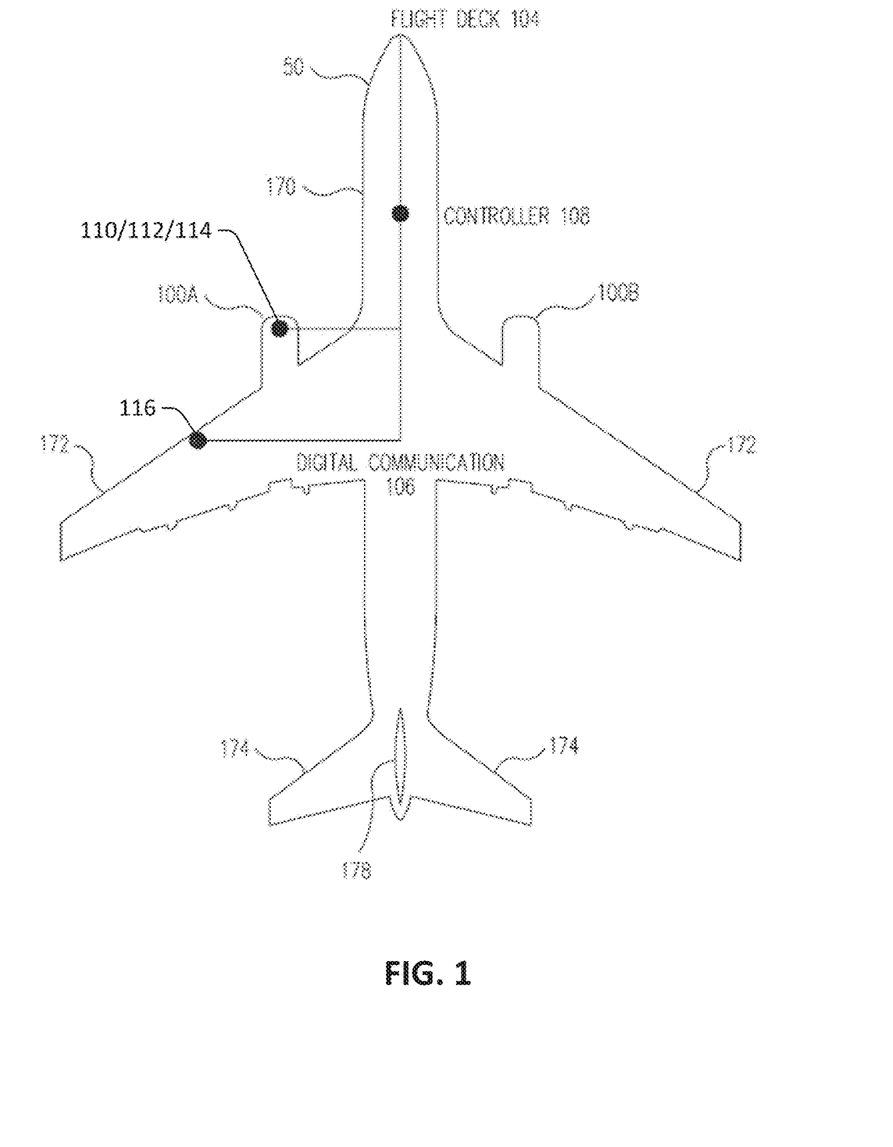
FIG. 1 illustrates a top view of an aircraft in accordance with an embodiment of the disclosure.

FIG. 1 illustrates a top view of an aircraft in accordance with an embodiment of the disclosure. The aircraft 50 of FIG. 1 includes a fuselage 170, wings 172, horizontal stabilizers 174, aircraft propulsors 100A and 100B, and a vertical stabilizer 178. Various controls and sensors are present on the aircraft 50. For example, the aircraft 50 includes a flight deck 104 where a pilot may input instructions for operation of the aircraft 50. The flight deck 104 of the aircraft 50 may include controls that may be manipulated by the pilot(s) of the aircraft 50 to provide instructions for the operation of the aircraft. For example, the flight deck 104 may include one or more user interfaces and/or a control or controls configured to control operation of the aircraft propulsors 100A and 100B. The flight deck 104 may also include controls for determining a configuration of the horizontal stabilizer or other aerodynamic device of the aircraft 50 as well as the configuration of the vertical stabilizer.

The inputs may be communicated to the system controller 108, which may then provide outputs to various systems of the aircraft 50 (e.g., aircraft propulsors 100A and 100B). The various systems of the aircraft 50 are linked with digital communications 106, which provides signals from one component of the aircraft 50 to one or more other components. The digital communication channel 106 may, for example, be a wired communication circuit or a wireless communications system. The digital communication channel 106 may link the various components to the system controller 108.

The system controller 108 may include, for example, a single-core or multi-core processor or microprocessor, a microcontroller, a logic device, a signal processing device, memory for storing executable instructions (e.g., software, firmware, or other instructions), and/or any elements to perform any of the various operations described herein. In various examples, the system controller 108 and/or its associated operations may be implemented as a single device or multiple devices (e.g., communicatively linked through wired or wireless connections such as the digital communication channel 106) to collectively constitute the system controller 108.

The system controller 108 may include one or more memory components or devices to store data and information. The memory may include volatile and non-volatile memory. Examples of such memories include RAM (Random Access Memory), ROM (Read-Only Memory), EEPROM (Electrically-Erasable Read-Only Memory), flash memory, or other types of memory. In certain examples, the system controller 108 may be adapted to execute instructions stored within the memory to perform various methods and processes described herein, including implementation and execution of control algorithms responsive to sensor and/or operator (e.g., flight crew) inputs.

In certain examples, the aircraft 50 can include one or more ports 110, one or more pressure sensors 112, and one or more acoustic sensors 114. Static pressure sensor 112 and acoustic sensor 114 can output data to the controller 108 via digital communication 106.

In certain such examples, each static pressure sensor 112 is disposed within a port 110. Such a static pressure sensor 112 can be disposed within the port 110 so that error in readings of the static pressure sensor 112 due to air pressure gradients resulting from movement of the aircraft 50 is minimized. As such, each of the pressure sensors 112 can be disposed so that dynamic pressure from movement of the aircraft 50 can be minimized to more accurately measure static pressure of an environment around or within the aircraft 50.

Acoustic disturbance within an environment can affect pressure readings of the static pressure sensor 112. Such acoustic disturbance can be due to, for example, background noise, noise generated by operation of one or more systems of the aircraft 50 (e.g., operation of the propulsors, flaps, landing gear, and/or other systems), wind noise, noise generated from within the aircraft 50, and/or other sources of noise or acoustic disturbance. Each acoustic sensor 114 is disposed adjacent to at least one port 110 and/or static pressure sensor 112. The acoustic sensor 114 is disposed so that the acoustic sensor 114 can measure acoustic disturbance. In certain such examples, one or more of the acoustic sensors 114 can be disposed so that it measures acoustic disturbance substantially indicative of acoustic disturbance of the environment around at least one of the pressure sensors 112 (e.g., the acoustic sensors 114 may each be disposed next to one or more ports 110). In certain such examples, each acoustic sensor 114 is disposed 24 inches or less from a port 110. Disposing the acoustic sensors 114 close to the ports can allow for more accurate correction of data from the pressure sensors 112 within the ports 110 by more accurately compensating for the error from the pressure sensors 112 due to acoustic disturbance in the environment around the pressure sensors 112. Systems and techniques for correction of such errors are further described herein.

The aircraft 50 described in FIG. 1 is exemplary and it is appreciated that in other embodiments, the aircraft 50 may include less or additional components (e.g., no horizontal stabilizer, additional stabilizers, additional sensors, and/or additional controllers). Additionally, concepts described herein may be extended to other aircraft (e.g., helicopters, Unmanned Aerial Vehicles, etc.), other vehicles (e.g., automobiles, watercraft, and/or trains), and/or other applications (e.g., scale wind tunnel test models).

Figure 2:
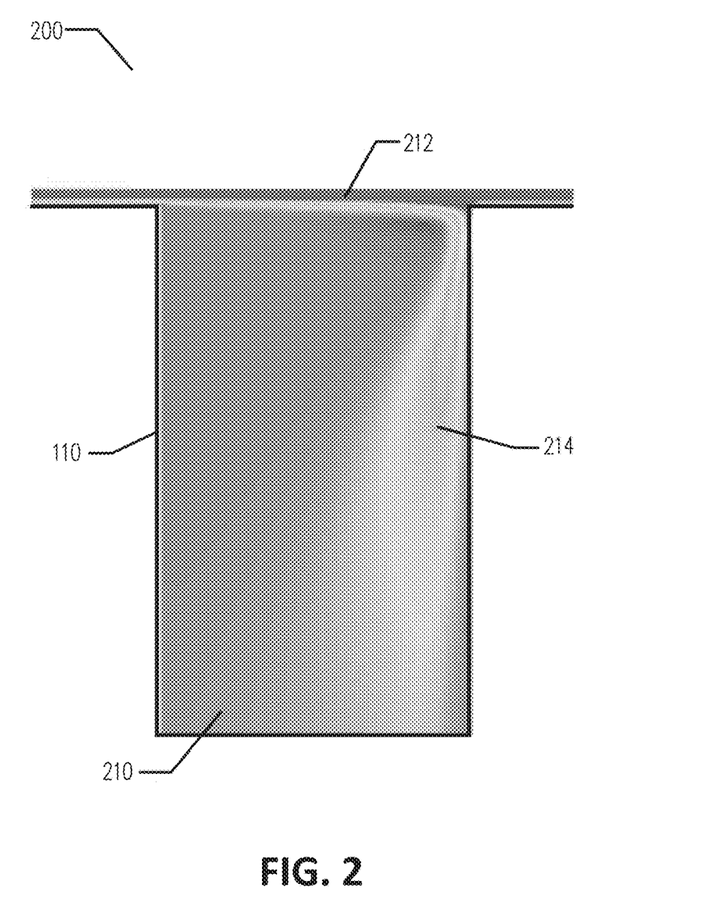
FIG. 2 illustrates a view of an example pressure distribution within a static pressure port disposed on an operational aircraft in accordance with an embodiment of the disclosure.

FIG. 2 illustrates a view of an example pressure distribution within a static pressure port disposed on an operational aircraft in accordance with an embodiment of the disclosure. FIG. 2 depicts a pressure distribution 200 within port 110. Pressure distribution 200 includes a static pressure component 210, a dynamic pressure component 212, and pressure bleed component 214.

As shown in FIG. 2, the static pressure component 210 is from static pressure of an environment around the port 110. In certain examples, the static pressure can be from, for example, barometric pressure due to altitude of the environment. In certain examples, the static pressure sensor 112 is configured to sense pressure within the port 110 and output data to the controller 108. The controller 108 can then correct such data (e.g., correct for acoustic disturbance within the port 110 and/or any dynamic pressure within the port 110 that can affect the static pressure reading by the static pressure sensor 112) to arrive at an accurate determination of the static pressure of the environment.

The dynamic pressure component 212 can be due to, at least, movement of the aircraft 50. The dynamic pressure component 212 can be from air moving over a surface of the aircraft 50 (e.g., a stream of flowing air). Movement of the air can result in a decrease in measured pressure. Accordingly, the port 110 can be configured to prevent all or most of the dynamic pressure component 212 from entering the port 110. For example, the port 110 can include geometric features (e.g., one or more rounded edges to minimize and/or prevent the dynamic pressure component 212 from spilling into the port 110), be appropriately sized (e.g., of a sufficient depth to prevent the dynamic pressure component 212 from reaching the sensor 112), and/or be configured in another such manner to prevent all or most of the dynamic pressure component 212 from entering the port 110.

In certain examples though, the port 110 can nonetheless include pressure bleed from the dynamic pressure component 212. Such pressure bleed is shown in pressure bleed component 214. As illustrated, pressure bleed component 214 can be a portion of the dynamic pressure component 212 that flows into the port 110 by, for example, catching an edge of the port 110. In certain such examples, the pressure bleed component 214 can lead to error in the static pressure measured by the static pressure sensor 112 as the measurements of the static pressure sensor 112, which is configured to measure static pressure, can include a component resulting from the pressure bleed component 214, in addition to a component from the static pressure component 210. Such an error can be corrected by the controller 108 by, for example, determining the speed, yaw, attitude, and/or other dynamic parameters of the aircraft 50 and correcting the data of the static pressure sensor 112 according to one or more of such determinations.

Figure 3:
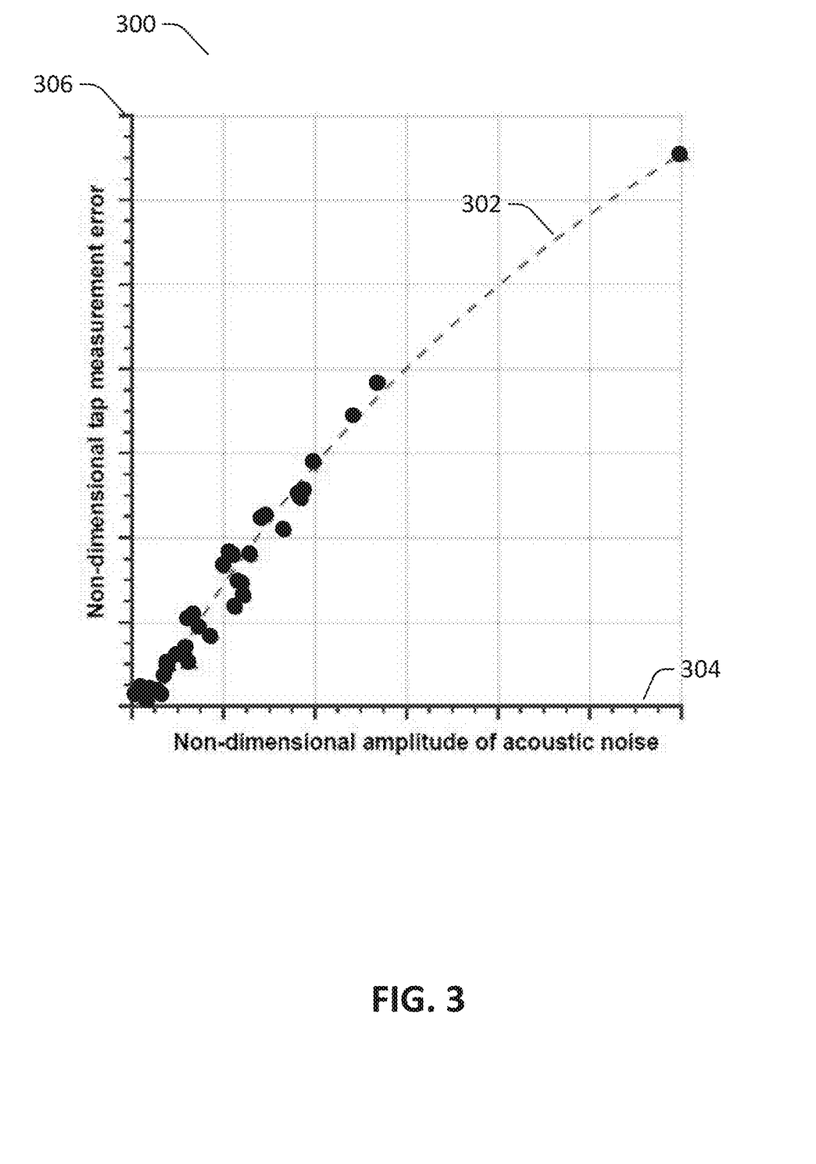
FIG. 3 is a graph showing a relationship between pressure sensor measurement error and acoustic noise in accordance with an embodiment of the disclosure.

FIG. 3 is a graph showing a relationship between pressure sensor measurement error and acoustic noise in accordance with an embodiment of the disclosure. FIG. 3 illustrates graph 300 of a relationship between acoustic disturbance (e.g., acoustic noise) and pressure sensor error determined by the present inventors. X-axis 304 of graph 300 is acoustic noise, where acoustic noise increases towards the right of the x-axis 304. Y-axis 306 of graph 300 is measurement error of the pressure sensor, where error increases towards the top of the y-axis 306.

As shown in trend line 302 of graph 300, as acoustic noise increases, measurement error of the pressure sensor increases as well. Accordingly, the error from the acoustic noise must be corrected if accurate static pressure readings are to be determined from data of the pressure sensor.

Figure 4:
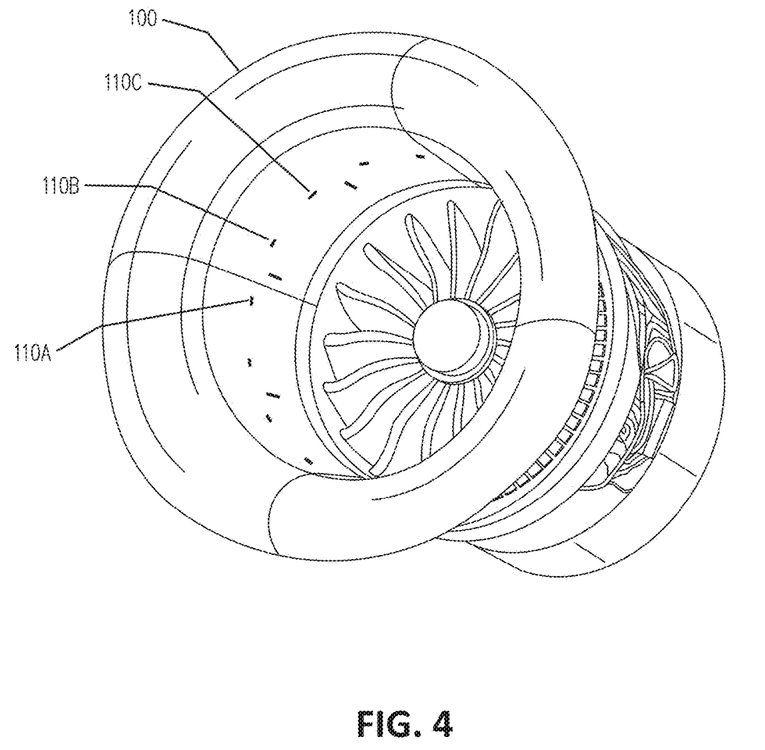
FIG. 4 illustrates an aircraft propulsor with static pressure ports in accordance with an embodiment of the disclosure.

FIG. 4 illustrates an aircraft propulsor with static pressure ports in accordance with an embodiment of the disclosure. FIG. 4 shows aircraft propulsor 100. The aircraft propulsor 100 includes a plurality of ports, including ports 110A-C as well as other additional ports. One or more pressure sensors can be disposed within each of the ports. Additionally, an acoustic sensor can be disposed adjacent to each of the ports to determine acoustic disturbance.

FIG. 4 illustrates one example of the systems and techniques described herein. In other examples, the ports can be disposed on portions of the aircraft 50 additional and/or alternative to the aircraft propulsor 100, such as the wings 172, the horizontal stabilizers 174, the vertical stabilizer 178, and/or the fuselage 170. Certain other examples can dispose the ports on portions of a scaled wind tunnel model of the aircraft 50, such as a scaled wind tunnel model of the aircraft propulsor 100, the wings 172, the horizontal stabilizers 174, the vertical stabilizer 178, and/or the fuselage 170. Additionally, such examples can include any number of ports, pressure sensors, and/or acoustic sensors. For example, certain such examples can include acoustic sensors disposed adjacent to the ports, disposed away from the ports, but configured to determine acoustic disturbance indicative of acoustic disturbance within the ports, include a plurality of acoustic sensors configured to determine acoustic disturbance within one port, and/or include one acoustic sensor configured to determine acoustic disturbance within a plurality of ports.

Figure 5:
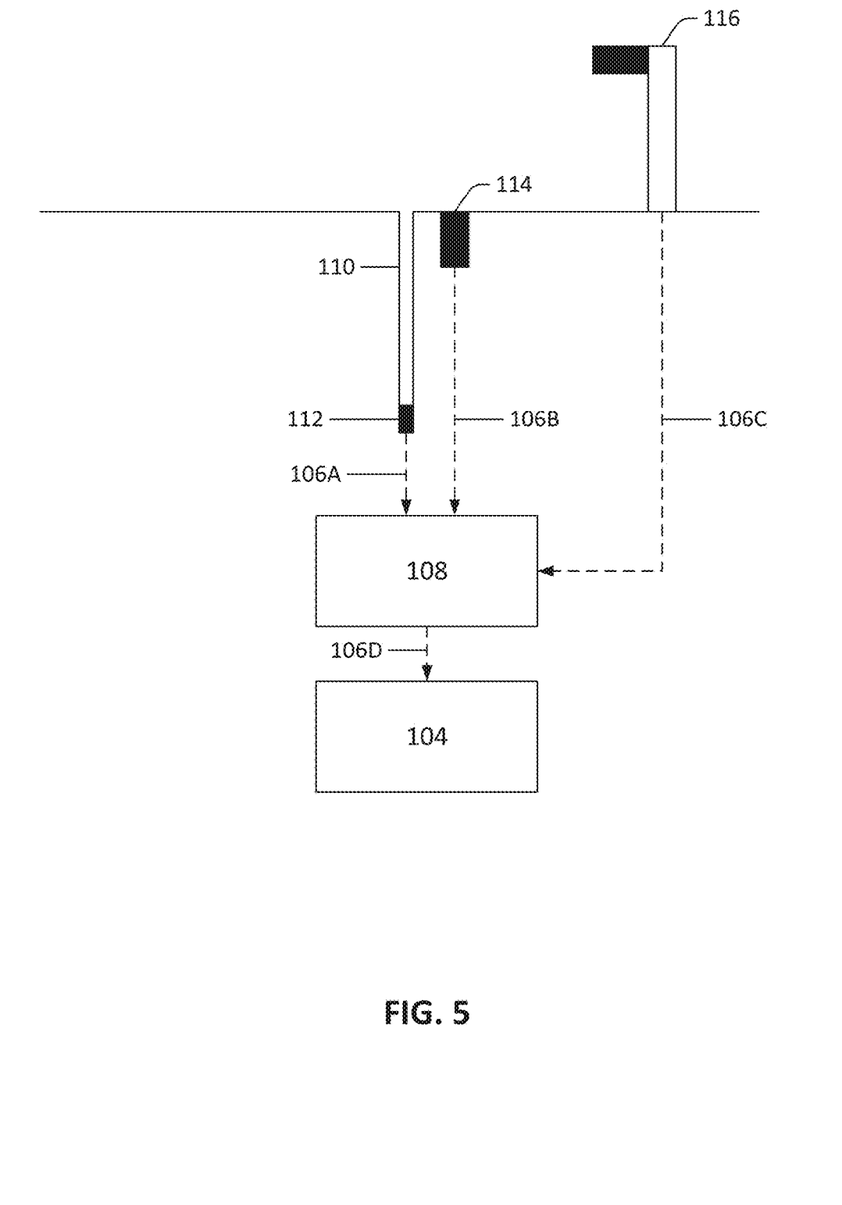
FIG. 5 is a schematic illustration of a pressure detection system in accordance with an embodiment of the disclosure.

FIG. 5 is a schematic illustration of a pressure detection system in accordance with an embodiment of the disclosure. The pressure detection system in FIG. 5 includes the port 110, the static pressure sensor 112, the acoustic sensor 114, the dynamic pressure sensor 116, the controller 108, and the flight deck 104. Data from the static pressure sensor 112, the acoustic sensor 114, and the dynamic pressure sensor 116 can be communicated to the controller 108 via digital communications 106A, 106B, and 106C, respectively. The controller 108 can communicate data to the flight deck 104 via digital communications 106D.

The port 110 can be a static pressure port. The port 110 can be configured to prevent all or most movement of air outside the port 110 from reaching the static pressure sensor 112. Thus, the port 110 can be configured to substantially isolate the static pressure sensor 112 from the dynamic pressure component 212 shown in FIG. 2. As such, the port 110 can include geometric features (e.g., one or more rounded edges to minimize and/or prevent the dynamic pressure component 212 from spilling into the port 110), be appropriately sized (e.g., of a sufficient depth to prevent the dynamic pressure component 212 and/or the pressure bleed component 214 from reaching the sensor 112 such as, for example, a ratio of length to diameter of less than 5 to 1, less than 10 to 1, less than 20 to 1, or more than 20 to 1), and/or be configured in another such manner to prevent all or most of moving air outside the port 110 from reaching the static pressure sensor 112.

The static pressure sensor 112 can be disposed at or near the bottom of the port 110. The static pressure sensor 112 is a pressure sensor configured to determine an environmental air pressure associated with the aircraft 50 (e.g., static air pressure due to altitude) and output primary pressure data indicating such environmental air pressure to the controller 108. As such, the static pressure sensor 112 can be positioned so that all or most of the dynamic pressure component 212 (e.g., due to air moving across a surface of the aircraft 50) and/or pressure bleed component 214 are prevented from reaching the static pressure sensor 112. The static pressure sensor 112 can be any type of pressure sensor, including pressure transducers, pressure transmitters, pressure senders, pressure indicators, piezometers, manometers, and/or other such devices.

The acoustic sensor 114 can be configured to determine acoustic disturbance within the environment around the static pressure sensor 112 that can affect pressure readings of the static pressure sensor 112 and output acoustic data to the controller 108. In certain examples, the acoustic sensor 114 is disposed adjacent to the port 110 and the static pressure sensor 112 (e.g., on a surface next to the port 110 such as, for example, within 2 feet, within a feet, within 6 inches, within 2 inches, and/or within 0.5 inches or less of the port 110) in order to measure acoustic disturbance of the environment within and/or around the port 110. In certain other examples, the acoustic sensor 114 can be disposed within the port 110 and/or on another portion of the aircraft 50. As such, the acoustic sensor 114 is disposed in a location and/or manner such that the acoustic sensor 114 can accurately measure acoustic disturbance within the port 110. The acoustic sensor 114 can be configured to minimize airflow disturbance (e.g., can be flush with a surface of the aircraft 50 such as the surface that the port 110 is disposed in). In certain such examples, the acoustic sensor 114 can be an acoustic transducer, piezoelectric sensor, microphone, and/or other such devices.

The dynamic pressure sensor 116 can be configured to measure dynamic pressure from, at least, movement of air over a surface of the aircraft 50 and output dynamic pressure data indicating such dynamic pressure to the controller 108. The dynamic pressure sensor 116 can be, for example, a pitot tube or other device disposed within an airstream (e.g., dynamic pressure component 212) to measure dynamic pressure experienced by the aircraft 50 or a portion thereof. The dynamic pressure sensor 116 can be any type of pressure sensor configured to determine such dynamic pressure.

Certain other examples can include a total pressure sensor additional or alternative to the dynamic pressure sensor. Such a total pressure sensor can determine a total pressure from an environment around the aircraft 50. The total pressure can be, for example, a pitot tube or other device disposed on the aircraft 50. For the purposes of this disclosure, reference to "dynamic pressure" can also be applied to "total pressure." As such, techniques described herein that reference using dynamic pressure data to determine an amount of error in the static pressure data can also be performed using total pressure data.

Data from the static pressure sensor 112, the acoustic sensor 114, and the dynamic pressure sensor 116 can be communicated to the controller 108 via digital communication channels 106A, 106B, and 106C, respectively. Static pressure measured by the static pressure sensor 112 can include error resulting from dynamic pressure component 212 and acoustic disturbance. The controller 108 can be configured to receive data from the dynamic pressure sensor 116 and the acoustic sensor 114 to determine the amount of error in the static pressure data from the static pressure sensor 112 due to the dynamic pressure component 212 and the acoustic disturbance.

In certain examples, the controller 108 can be configured to determine, from data from the dynamic pressure sensor 116 and the acoustic sensor 114, error in the static pressure data from the static pressure sensor 112 due to the dynamic pressure component 212 and the acoustic disturbance and correct for such error. Certain other examples can use total pressure data additional or alternative to using dynamic pressure data to determine the error in the static pressure data.

For example, the controller 108 can receive, from the acoustic sensor 114, data indicating frequency, amplitude, and/or other characteristics of the acoustic disturbance and determine, from such data, appropriate corrections to the static pressure data obtained by the static pressure sensor 112. In certain such examples, acoustic disturbance within the port 110 can be similar to or different from, but correlated to, acoustic disturbance detected by the acoustic sensor 114. The controller 108 can then determine, based on data from the acoustic sensor 114, the amount of error in the static pressure data from data from the acoustic sensor 114 (e.g., a higher amplitude and/or volume of acoustic disturbance can indicate higher error in the static pressure data and/or different frequencies can indicate different amounts of error). Thus, the controller 108 can determine error in the static pressure data resulting from the acoustic disturbance from data of the acoustic sensor 114. The relationship between the acoustic disturbance and the static pressure data error can be determined empirically (e.g., during development of the aircraft 50) and/or learned during operation of the aircraft 50 by the controller 108.

Additionally, the controller 108 can also determine dynamic pressure detected by the dynamic pressure sensor 116 and determine, from data from the dynamic pressure sensor 116, error in the static pressure data due to the dynamic pressure. In certain examples, the controller 108 can determine the amount of airflow that bleeds into the port 110 during operation of the aircraft 50 by determining one or more of the speed, heading, yaw rate, heading change, altitude, environmental air pressure, humidity, and/or other conditions associated with operation of the aircraft 50. From such determinations, the amount of airflow bleeding into the port 110 and affecting the static pressure data can be determined. The relationship between such determinations and the static pressure data error can be determined empirically (e.g., during development of the aircraft 50) and/or learned during operation of the aircraft 50 by the controller 108.

The controller 108 can then correct the static pressure data for the error from the dynamic pressure and/or the acoustic disturbance to determine a true static pressure. The true static pressure can then be output to the flight deck 104 and displayed on a user interface (e.g., display showing the static pressure) and/or used to aid the pilot in controlling the aircraft 50 according to instructions received from the flight deck 104.

Figure 6:
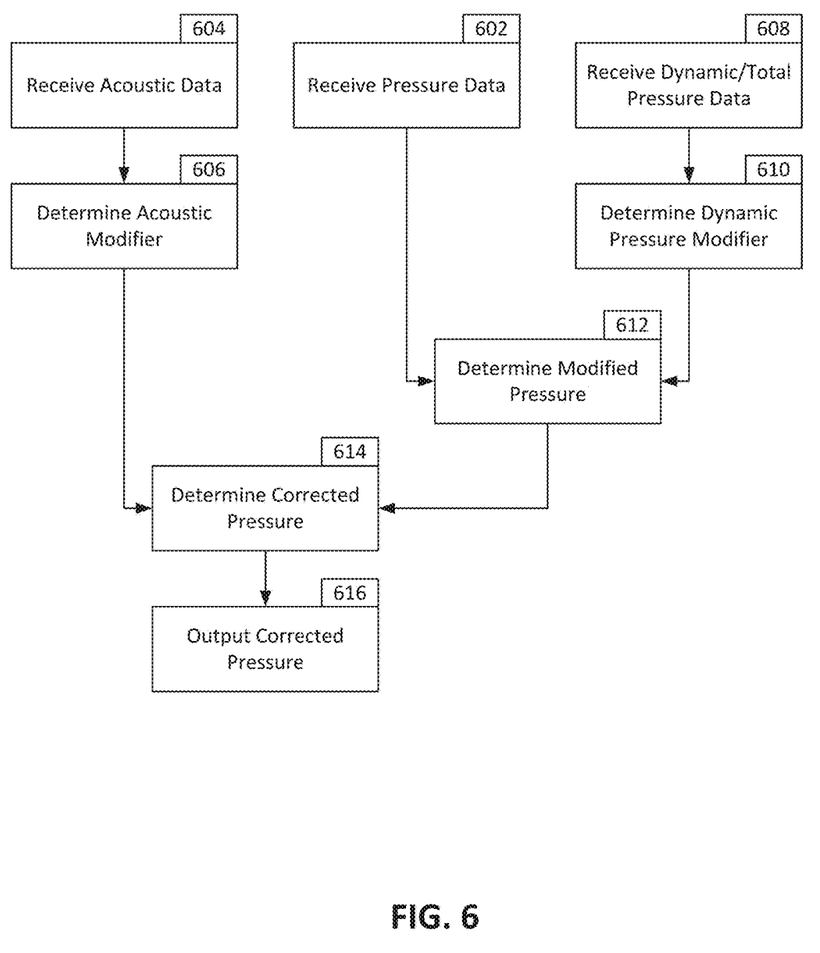
FIG. 6 is a flowchart detailing correction of pressure readings from pressure sensors in accordance with an embodiment of the disclosure.

FIG. 6 is a flowchart detailing correction of pressure readings from pressure sensors in accordance with an embodiment of the disclosure. In block 602, static pressure data from the static pressure sensor 112 is received by the controller 108. Additionally, dynamic pressure data detected by the dynamic pressure sensor 116 is received in block 608.

A dynamic pressure modifier can be determined in block 610. The dynamic pressure modifier can be a modifier to correct for error in the static pressure data resulting from airflow bleeding into the port 110. Such error can be due to the dynamic pressure component 212 due to one or more of the speed, heading, yaw rate, heading change, altitude, environmental air pressure, humidity, and/or other conditions associated with operation of the aircraft 50.

The controller 108 can then determine a modified pressure from the static pressure data and the dynamic pressure modifier in block 612. The modified pressure can be static pressure data that is corrected for any error resulting from dynamic pressure bleeding into the port 110 to affect readings by the static pressure sensor 112. In certain examples, the dynamic pressure modifier can be a determination of the error due to the dynamic pressure and the modified pressure can be the static pressure data with the dynamic pressure modifier removed.

Additionally, in block 604, acoustic data from the acoustic sensor 114 can be received from the controller 108. An acoustic modifier can be determined in block 606. The acoustic modifier can be a modifier to correct for error in the static pressure data resulting from acoustic disturbance affecting the static pressure sensor 112.

The controller 108 can then determine a corrected pressure from the modified pressure and the acoustic modifier in block 614. The corrected pressure can be a static pressure determination that has corrected for any error resulting from acoustic disturbance affecting the static pressure sensor 112. In certain examples, the acoustic modifier can be a determination of the error due to the acoustic disturbance and the corrected pressure can be the modified pressure with the error from the acoustic disturbance removed. The corrected pressure can thus be true static pressure. In certain examples, correcting for error from the acoustic disturbance and/or the dynamic pressure of the static pressure reading can be performed in a sequence different from that described (e.g., error from the acoustic disturbance can be corrected first and error from the dynamic pressure can be corrected second and/or only one of the errors from the acoustic disturbance and the dynamic pressure can be corrected).

After the corrected pressure is determined in block 614, the corrected pressure can be output to, for example, one or more user interfaces of the flight deck 104 and/or to other portions of one or more controllers. Thus, the corrected pressure can be displayed to the pilot and/or used to aid in control of the aircraft 50.

Examples described above illustrate but do not limit the invention. It should also be understood that numerous modifications and variations are possible in accordance with the principles of the present invention. Accordingly, the scope of the invention is defined only by the following claims.

What is claimed is:

1. A system comprising:
   an aircraft component;
   a port disposed within the aircraft component;
   a static pressure sensor disposed within the port and configured to provide primary pressure data in response to at least environmental air pressure and an acoustic disturbance;
   an acoustic sensor configured to provide acoustic data in response to the acoustic disturbance; and a processor communicatively coupled to the static pressure sensor and the acoustic sensor and configured to determine corrected static pressure data using the provided primary pressure data and the provided acoustic data.

2. The system of claim 1, wherein the acoustic data corresponds to at least an amplitude and a frequency of the acoustic disturbance.

3. The system of claim 1, wherein the processor is configured to determine an acoustic modifier from the provided acoustic data and apply the acoustic modifier to the provided primary pressure data to determine the corrected static pressure data, and wherein the acoustic modifier is configured to correct for an acoustic component of the provided primary pressure data.

4. The system of claim 1, wherein the static pressure sensor is a first pressure sensor and the system further comprises:
a second pressure sensor configured to provide dynamic and/or total pressure data in response to at least movement of an aircraft, wherein the processor is further configured to use the dynamic and/or total pressure data to determine the corrected static pressure data.

5. The system of claim 4, wherein the processor is configured to determine modified pressure data using the provided primary pressure data and the provided dynamic and/or total pressure data and use the modified pressure data to determine the corrected static pressure data, wherein the modified pressure data is configured to correct for a dynamic pressure component of the provided primary pressure data.

6. The system of claim 1, wherein the acoustic sensor is disposed within 2 feet of the port.

7. The system of claim 1, wherein the system is an aircraft.

8. The system of claim 1, wherein the aircraft component is a portion of an intake of an aircraft propulsor or a portion of a fuselage or a wing, and wherein the acoustic disturbance comprises acoustic noise generated by operation of the aircraft propulsor and/or movement of the aircraft component.

9. The system of claim 1, wherein the aircraft component is a scale wind tunnel model.

10. The system of claim 1, further comprising:
a plurality of ports disposed within the aircraft component;
a plurality of static pressure sensors, each static pressure sensor disposed within a corresponding one of the ports and configured to provide corresponding primary pressure data in response to at least corresponding environmental air pressure and a corresponding acoustic disturbance associated with the corresponding static pressure sensor; and
a plurality of acoustic sensors, each acoustic sensor associated with a corresponding one of the ports and configured to provide corresponding acoustic data in response to the corresponding acoustic disturbance associated with the corresponding static pressure sensor, wherein the processor is communicatively coupled to each of the plurality of static pressure sensors and acoustic sensors and the corrected static pressure data is determined using the plurality of corresponding provided primary pressure data and the plurality of corresponding provided acoustic data.

11. A method comprising:
receiving primary pressure data from a static pressure sensor in response to at least environmental air pressure and an acoustic disturbance, wherein the static pressure sensor is disposed within a port, and wherein the port is disposed within an aircraft component;
receiving acoustic data from an acoustic sensor in response to the acoustic disturbance; and
determining corrected static pressure data using the received primary pressure data and the received acoustic data.

12. The method of claim 11, wherein the acoustic data corresponds to at least an amplitude and a frequency of the acoustic disturbance.

13. The method of claim 11, wherein determining the corrected static pressure data further comprises determining an acoustic modifier from the received acoustic data and applying the acoustic modifier to the received primary pressure data, and wherein the acoustic modifier is configured to correct for an acoustic component of the received primary pressure data.

14. The method of claim 11, wherein the static pressure sensor is a first pressure sensor and the method further comprises:
receiving dynamic and/or total pressure data from a second pressure sensor in response to at least movement of an aircraft, wherein determining the corrected static pressure data also uses the received dynamic and/or total pressure data.

15. The method of claim 14, wherein determining the corrected static pressure data further comprises determining modified pressure data using the received primary pressure data and the received dynamic and/or total pressure data, and wherein the modified pressure data is configured to correct for a dynamic pressure component of the received primary pressure data.

16. The method of claim 11, wherein the acoustic sensor is disposed within 2 feet of the port.

17. The method of claim 11, wherein static pressure sensor and the acoustic sensor are disposed on an aircraft.

18. The method of claim 17, wherein the static pressure sensor and/or the acoustic sensor are disposed on a portion of an intake of an aircraft propulsor or a portion of a fuselage or a wing, and wherein the acoustic disturbance comprises acoustic noise generated by operation of the aircraft propulsor and/or movement of the aircraft component.

19. The method of claim 11, wherein the aircraft component is a scale wind tunnel model.

20. The method of claim 11, further comprising:
receiving primary pressure data from a plurality of static pressure sensors, each of the plurality of static pressure sensors disposed within a corresponding one of a plurality of ports, wherein the plurality of ports are disposed within the aircraft component; and
receiving acoustic data from a plurality of acoustic sensors, each of the plurality of acoustic sensors associated with a corresponding port, wherein the corrected static pressure data is determined using the plurality of corresponding received primary pressure data and the plurality of corresponding received acoustic data.

* * * * *